(12) United States Patent
Niksa et al.

(10) Patent No.: US 9,365,425 B2
(45) Date of Patent: *Jun. 14, 2016

(54) HIGH PRESSURE DISSOLVED OXYGEN GENERATION

(71) Applicant: Water Star, Inc., Newburn, OH (US)

(72) Inventors: Marilyn J. Niksa, Chardon, OH (US); Andrew J. Niksa, Chardon, OH (US)

(73) Assignee: WATER STAR, INC., Newbury, OH (US)

( * ) Notice: Subject to any disclaimer, the term of this patent is extended or adjusted under 35 U.S.C. 154(b) by 572 days.

This patent is subject to a terminal disclaimer.

(21) Appl. No.: 13/841,976

(22) Filed: Mar. 15, 2013

(65) Prior Publication Data

US 2014/0113819 A1    Apr. 24, 2014

Related U.S. Application Data

(60) Provisional application No. 61/695,655, filed on Aug. 31, 2012.

(51) Int. Cl.
*C02F 1/68* (2006.01)
*C02F 1/72* (2006.01)
(Continued)

(52) U.S. Cl.
CPC ............... *C01B 13/0214* (2013.01); *C02F 1/68* (2013.01); *C02F 1/46* (2013.01); *C02F 1/686* (2013.01); *C02F 1/722* (2013.01); *C02F 1/725* (2013.01); *C02F 1/727* (2013.01); *C02F 2103/20* (2013.01);
(Continued)

(58) Field of Classification Search
CPC .............. C02F 1/68; C02F 1/686; C02F 1/70; C02F 1/72; C02F 1/722; C02F 1/725; C02F 1/727; C02F 2301/022; C02F 2209/005; C02F 2209/03; C02F 2209/22; C02F 2103/346; C01B 13/0214

See application file for complete search history.

(56) References Cited

U.S. PATENT DOCUMENTS 3,882,223 A   5/1975   Reinhardt
3,917,461 A   11/1975  Kuhl et al.
(Continued)

FOREIGN PATENT DOCUMENTS

GB   2167054   5/1986
JP   63285103  11/1988
(Continued)

OTHER PUBLICATIONS

Notification of Transmittal of the International Search Report and the Written Opinion of the International Searching Authority, or the Declaration of corresponding application PCT/US2013/055661, mailed Nov. 6, 2013, 7 pages.
(Continued)

*Primary Examiner* — Lucas Stelling
(74) *Attorney, Agent, or Firm* — Fredrikson & Byron, P.A.

(57) ABSTRACT

Dissolved oxygen may be generated by adding a peroxide to a fluid stream and then catalytically decomposing the peroxide to generate oxygen. As the peroxide is catalytically decomposed, the oxygen may solubilize in a surrounding fluid so as to provide dissolved oxygen. In some examples, the amount of peroxide added to the fluid stream is controlled such that substantially all of the hydrogen peroxide added to the fluid stream catalytically decomposes and yet the dissolved oxygen concentration of the fluid stream does not exceed a dissolved oxygen saturation limit for the fluid stream.

25 Claims, 4 Drawing Sheets

(51) Int. Cl.
*C01B 13/02* (2006.01)
*C02F 1/46* (2006.01)
*C02F 103/20* (2006.01)

(52) U.S. Cl.
CPC ....... *C02F 2209/03* (2013.01); *C02F 2301/022* (2013.01); *C02F 2301/063* (2013.01); *C02F 2301/066* (2013.01)

(56) References Cited

U.S. PATENT DOCUMENTS

| | | | |
|---|---|---|---|
| 4,255,266 A | 3/1981 | Moreaud et al. | |
| 4,466,556 A | 8/1984 | Sochting | |
| 4,549,969 A | 10/1985 | Gerlach et al. | |
| 4,683,130 A | 7/1987 | Ueno et al. | |
| 4,752,461 A | 6/1988 | Coeckelberghs et al. | |
| 4,792,435 A | 12/1988 | Nakajima | |
| 5,019,268 A | 5/1991 | Rogalla | |
| 5,587,191 A | 12/1996 | Donsbach et al. | |
| 5,665,316 A | 9/1997 | Salonia et al. | |
| 5,792,090 A | 8/1998 | Ladin | |
| 5,868,944 A | 2/1999 | Wright et al. | |
| 5,904,851 A | 5/1999 | Taylor et al. | |
| 5,938,981 A | 8/1999 | Burgess | |
| 6,004,469 A | 12/1999 | Sanders et al. | |
| 6,017,447 A | 1/2000 | Wright et al. | |
| 6,279,882 B1 | 8/2001 | Littman et al. | |
| 6,284,293 B1 | 9/2001 | Crandall et al. | |
| 6,310,000 B1 | 10/2001 | Matviya et al. | |
| 6,612,259 B2 | 9/2003 | Yoshida et al. | |
| 6,689,262 B2 | 2/2004 | Senkiw | |
| 6,912,972 B1 | 7/2005 | Tsai | |
| 6,991,772 B1 | 1/2006 | Rusek | |
| 7,137,621 B1 | 11/2006 | Bagley | |
| 7,347,944 B2 | 3/2008 | Bagley | |
| 7,631,615 B1 | 12/2009 | Mast | |
| 8,329,098 B2 | 12/2012 | Kanner | |
| 2008/0247926 A1 | 10/2008 | Osterloh | |
| 2008/0262413 A1 | 10/2008 | Ladizinsky | |
| 2009/0127201 A1* | 5/2009 | Kobayashi | B01D 19/0073 210/668 |
| 2010/0140171 A1 | 6/2010 | Heath et al. | |
| 2010/0270240 A1* | 10/2010 | Hebert | B01F 5/0473 210/668 |
| 2011/0237857 A1 | 9/2011 | Barrera et al. | |

FOREIGN PATENT DOCUMENTS

| | | |
|---|---|---|
| JP | 3028101 | 2/1991 |
| WO | 9823544 | 6/1998 |
| WO | 2009036558 | 3/2009 |

OTHER PUBLICATIONS

PCT International Search Report and Written Opinion dated Apr. 11, 2014 for Intl. App. No. PCT/US2013/055560, 8 pgs.

\* cited by examiner

HIGH PRESSURE DISSOLVED OXYGEN GENERATION

This application claims the benefit of U.S. Provisional Patent Application No. 61/695,655, filed Aug. 31, 2012, the entire contents of which are incorporated herein by reference.

TECHNICAL FIELD

This disclosure relates to oxygen generation and, more particularly, to generating dissolved oxygen in water and aqueous solutions.

BACKGROUND

Dissolved oxygen is important in many industrial applications including, for example, hydroponics, aquaculture (i.e., aquafarming), and the treatment of groundwater.

Hydroponics is a process for growing plants (such as, flowers and vegetables) in a nutrient aqueous solution (i.e., a "soil-less medium"), rather than in soil. The nutrients are distributed to the plants through water. A major advantage of hydroponics is that the roots of the plants have constant access to oxygen, and as much or as little water as needed. The presence of oxygen in the root zone is essential for healthy plants. In this respect, the growth rate and overall health of the plants are directly related to the amount of dissolved oxygen present in the nutrient aqueous solution.

In fish farming, aquariums and aquatic animal management, oxygenation of the water is important to enhancing the growth of the fish and marine animals. Moreover, the oxygen destroys any biological contaminants in the water. These biological contaminants may arise from excess foodstuff and from the fish and marine animals.

Well water is commonly used as a residential water supply. However, well water frequently contains undesirable concentrations of iron, arsenic salts, and hydrogen sulfide, due to very low concentrations of dissolved oxygen. Adding oxygen to the well water can reduce the concentrations of these nuisance materials. In this respect, oxygen dissolved in the well water reacts with the inorganic salts, forming insoluble iron oxide ($Fe_2O_3$) and arsenic (V) oxide, which can be filtered out. Hydrogen sulfide, which can be a problem in hot water heaters, is also oxidized by the dissolved oxygen.

SUMMARY

In general, this disclosure is directed to systems, devices, and techniques for generating dissolved oxygen in an aqueous fluid. In some examples, a peroxide is added to a water stream whose dissolved oxygen content is to be increased. The combined stream is then passed over a catalyst to catalytically decompose the peroxide into oxygen and a secondary decomposition product, such as water. The amount of peroxide added to the water stream may be controlled, among other factors, so that the amount of oxygen generated upon catalytic decomposition of the peroxide does not exceed a dissolved oxygen saturation limit for the stream. If the amount of oxygen generated by catalytic decomposition exceeds the saturation limit, the excess oxygen may bubble out of the water as gaseous oxygen that is lost to the surrounding atmosphere. Moreover, in applications where the decomposition catalyst is not one hundred percent efficient, excess peroxide may remain in the water stream after passing over the catalyst. This peroxide may act as a contaminant in downstream applications utilizing the water stream, such as hydroponic and aquaculture facilities. By controlling the amount of peroxide added to the water stream, the amount of peroxide remaining after reaction may be controlled.

In one example, a process for generating dissolved oxygen is described that includes receiving from a source a fluid stream comprising water and adding hydrogen peroxide to the fluid stream so as to generate a dilute hydrogen peroxide stream having a concentration of hydrogen peroxide. The example process also includes passing the dilute hydrogen peroxide stream through a reactor containing catalyst so as to catalytically decompose the hydrogen peroxide into oxygen and water such that substantially all of the hydrogen peroxide added to the fluid stream catalytically decomposes to increase a dissolved oxygen concentration of the fluid stream and yet the dissolved oxygen concentration does not exceed a dissolved oxygen saturation limit for the fluid stream.

In another example, a process for generating dissolved oxygen is described that includes introducing a concentration of peroxide into an aqueous fluid to form a dilute peroxide solution, where the concentration of peroxide is selected such that, when all the peroxide decomposes in the aqueous fluid to generate dissolved oxygen, a concentration of the dissolved oxygen in the aqueous fluid is below a dissolved oxygen saturation limit for the aqueous fluid, and catalytically decomposing the peroxide in the dilute peroxide solution to generate dissolved oxygen.

In another example, a system is described that includes a fluid source that provides a fluid stream comprising water, a peroxide source, a reactor containing catalyst, and a processor. The example specifies that the processor is configured to control addition of peroxide from the peroxide source into the fluid stream so as to generate a dilute peroxide stream having a concentration of peroxide, and control passage of the dilute peroxide stream through the reactor so as to catalytically decompose the peroxide and generate oxygen, the processor being configured to control addition of the peroxide such that, when substantially all of the peroxide added to the fluid stream catalytically decomposes, a dissolved oxygen concentration of the fluid stream increases but does not exceed a dissolved oxygen saturation limit for the fluid stream.

In another example, a process for generating dissolved oxygen is described that includes receiving from a source a fluid stream comprising water, adding hydrogen peroxide to the fluid stream so as to generate a dilute hydrogen peroxide stream having a concentration of hydrogen peroxide, and pressurizing the dilute hydrogen peroxide stream so as to increase a dissolved oxygen saturation limit of the dilute hydrogen peroxide stream and thereby provide a pressurized dilute hydrogen peroxide stream. The example also includes passing the pressurized dilute hydrogen peroxide stream through a reactor containing catalyst so as to catalytically decompose the hydrogen peroxide into oxygen and water and thereby generate an oxygenated fluid stream having a concentration of dissolved oxygen, and reducing the pressure of the oxygenated fluid stream to a reduced pressure. The example specifies that the concentration of dissolved oxygen in the oxygenated fluid stream prior to reducing the pressure is below a dissolved oxygen saturation limit of the oxygenated fluid stream at the reduced pressure.

In another example, a process for generating dissolved oxygen is described that includes introducing peroxide into an aqueous fluid to form a dilute peroxide solution having a concentration of the peroxide, pressurizing the dilute peroxide solution and thereby increasing a dissolved oxygen saturation limit of the dilute peroxide solution, catalytically decomposing the peroxide in the dilute peroxide solution to generate dissolved oxygen and thereby form an oxygenated fluid, and reducing a pressure of the oxygenated fluid and thereby decreasing the dissolved oxygen saturation limit of the oxygenated fluid. The example specifies that introducing the peroxide comprises introducing an amount of peroxide that, when catalytically decomposed, provides a dissolved oxygen concentration in the oxygenated fluid below the dissolved oxygen saturation limit of the oxygenated fluid after reducing the pressure.

In another example, a system is described that includes a fluid source that provides a fluid stream comprising water, a peroxide source, a pump, a reactor containing catalyst, a pressure reducer, and a processor. The example specifies that the processor is configured to control addition of peroxide from the peroxide source into the fluid stream so as to generate a dilute peroxide stream having a concentration of peroxide, control the pump to pressurize the dilute peroxide stream so as to increase a dissolved oxygen saturation limit of the dilute peroxide stream, and control passage of the pressurized dilute peroxide stream through the reactor so as to catalytically decompose the peroxide and generate oxygen and thereby form an oxygenated fluid. The example further specifies that the pressure reducer is positioned downstream of the reactor and configured to reduce a pressure of the oxygenated fluid down to a reduced pressure, and that the processor is configured to control addition of the peroxide so as to add an amount of peroxide that, when catalytically decomposed, provides a dissolved oxygen concentration in the oxygenated fluid below the dissolved oxygen saturation limit of the oxygenated fluid at the reduced pressure.

The details of one or more examples are set forth in the accompanying drawings and the description below. Other features, objects, and advantages will be apparent from the description and drawings, and from the claims.

DETAILED DESCRIPTION

Figure 1:
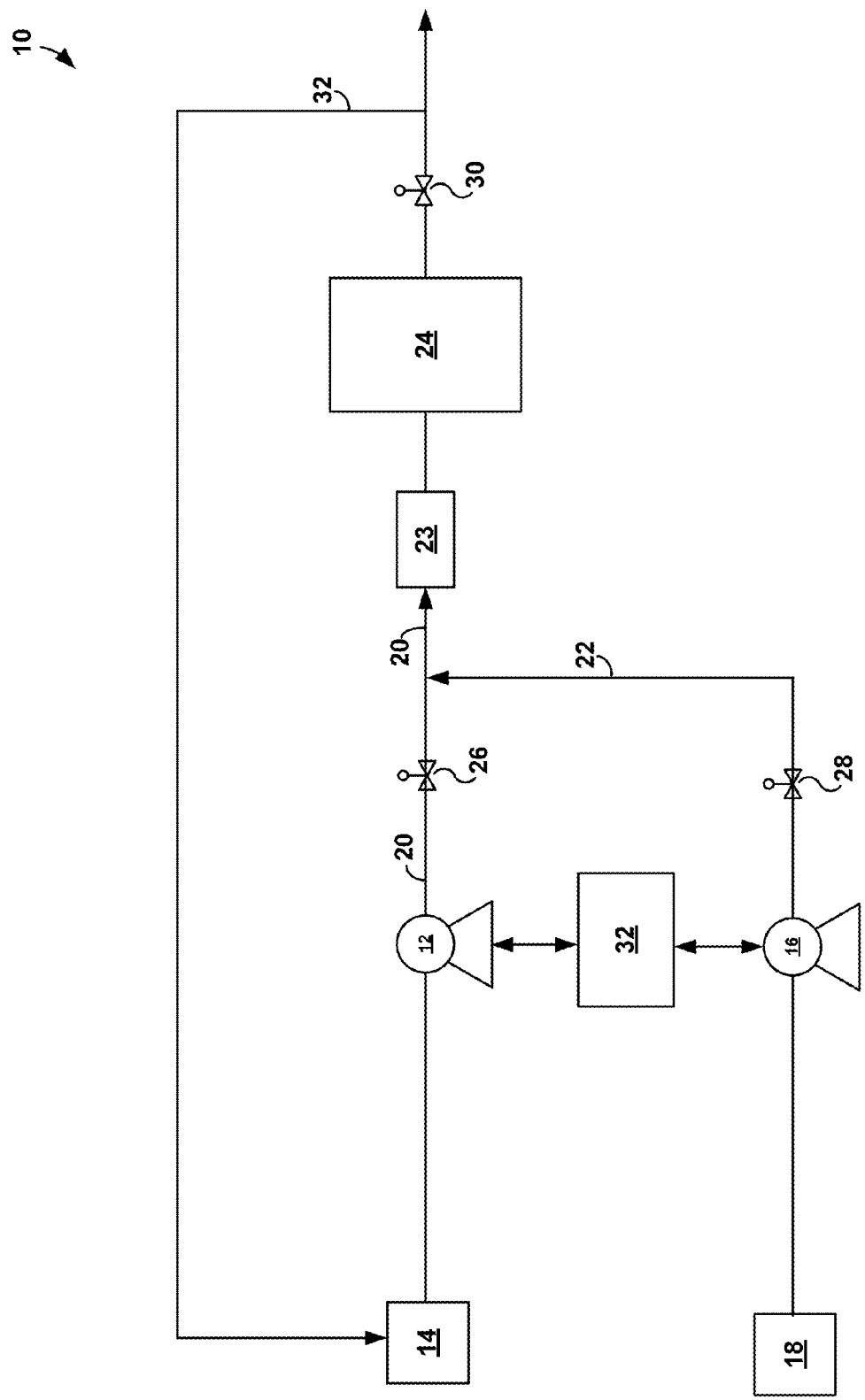
FIG. 1 is an illustration of an example dissolved oxygen generation system.

An aqueous stream containing dissolved oxygen can be useful for a variety of applications, such as treating water (e.g., well water, waste water) to oxidize contaminants that are then filtered out of the stream, providing oxygenated water for growing plants hydroponically, providing oxygenated water for aquatic animal cultivation (e.g., fish farms), and the like. In general, this disclosure describes devices, systems, and techniques for generating dissolved oxygen. In some examples, an oxygen source such as a peroxide is introduced into an aqueous stream to generate a dilute peroxide stream. The dilute peroxide stream is then passed through a reactor containing catalyst to catalytically decompose the peroxide and generate oxygen. The oxygen, which may be diatomic oxygen, dissolves in the aqueous stream to increase the dissolved oxygen concentration of the stream.

As described in some examples herein, the amount of peroxide added to the aqueous stream may be controlled based on the dissolved oxygen saturation limit of the stream. For example, the amount of peroxide added to the aqueous stream may be proportional to the amount of dissolved oxygen subsequently generated in the stream by catalytic decomposition. In general, the more peroxide added to the aqueous stream, the higher the concentration of dissolved oxygen in the aqueous stream following catalytic decomposition. However, at a certain point, the amount of oxygen generated by catalytic decomposition of the peroxide may exceed the amount of oxygen that the aqueous stream can practically hold. When this point is reached, which is typically referred to as the dissolved oxygen saturation limit, additional oxygen generated by the decomposition of the peroxide cannot be dissolved in the stream but instead is expelled from the stream. This expelled excess gas can manifest itself in the form of gas bubbles visibly bubbling out of the stream. The gas in these bubbles is typically lost in the surrounding atmosphere, presenting a source of inefficiency.

In some examples described in greater detail below, an aqueous stream is processed to increase the dissolved oxygen concentration of the stream while substantially or completely eliminating the generation of gaseous oxygen bubbles in the stream. Instead, oxygen generated during the process may solubilize within the aqueous stream immediately upon being generated without ever going into a gaseous state. Accordingly, substantially all or all of the oxygen generated during such a process can be converted to dissolved oxygen in the aqueous stream. This can substantially or entirely eliminate gaseous oxygen loss from the stream, increasing the efficiency of the dissolved oxygen generation process. Additionally, in some applications, this can increase the rate at which an aqueous stream is processed to increase the dissolved oxygen concentration of the stream. For example, rather than generating gaseous oxygen that is then absorbed in the aqueous stream through a comparatively time consumed gas-liquid interface absorption process, a direct oxygen generation-to-dissolved oxygen process may provide a quicker mechanism for increasing the dissolved oxygen concentration of the stream.

In one example, the process involves controlling the amount of peroxide added to the aqueous stream so that, when the peroxide catalytically decomposes, the concentration of dissolved oxygen is at or below the dissolved oxygen saturation limit of the stream. For example, upon receiving an aqueous stream whose dissolved oxygen concentration is to be increased, the process identifies a target amount of dissolved oxygen to add to the aqueous stream. The target amount of dissolved oxygen is below an amount that exceeds the dissolved oxygen saturation limit of the stream. The process may then identify a corresponding amount of peroxide necessary to generate the target amount of dissolved oxygen and introduce the corresponding amount into the aqueous stream.

In another example, the process involves receiving an aqueous stream whose dissolved oxygen concentration is to be increased and adjusting the dissolved oxygen saturation limit of the stream. In different applications, the temperature of the stream may be reduced, the pressure of the stream increased, or the composition of the stream adjusted (e.g., by expelling non-oxygen gasses dissolved in the stream) to increase the dissolved oxygen saturation limit of the stream. By increasing the dissolved oxygen saturation limit of the stream, a greater amount of oxygen can be dissolved in the stream without exceeding the saturation limit of the stream.

Additionally, even if a lower amount of oxygen is dissolved in the stream than would be possible given an increased dissolved oxygen saturation limit, the oxygen may dissolve more readily in the stream because of the increased dissolved oxygen saturation limit. The rate at which oxygen dissolves in a stream may be proportional to the concentration of oxygen already dissolved in the stream. The higher the oxygen concentration in the stream, the more difficult it may be to add yet more oxygen to the stream. For example, as the dissolved oxygen concentration approaches the saturation limit, it may become exponentially more difficult to further increase the dissolved oxygen concentration of the stream up to the saturation limit. By increasing the dissolved oxygen saturation limit of the stream, however, oxygen may dissolve in the stream at a concentration which, were the dissolved oxygen saturation limit not elevated, would slow down the rate of oxygen dissolution.

FIG. 1 is an illustration of an example dissolved oxygen generation system 10 in which oxygen-containing molecules are decomposed to increase the dissolved oxygen concentration of an aqueous fluid. System 10 includes an aqueous fluid pump 12 fluidly connected to a source of aqueous fluid 14. System 10 also includes a peroxide fluid pump 16 fluidly connected to a source of peroxide 18. During operation, aqueous fluid pump 12 can draw aqueous fluid from source 14 at a suction side of the pump, pressurize the fluid inside of the pump, and discharge the fluid at an elevated pressure into fluid conduit 20. Similarly, peroxide fluid pump 16 can draw a peroxide solution from source 18 at a suction side of the pump, pressurize the peroxide solution inside of the pump, and discharge the peroxide at an elevated pressure into fluid conduit 22. Fluid conduit 22 from peroxide fluid pump 16 is fluidly connected to fluid conduit 20 from aqueous fluid pump 12. During operation of system 10 when both pumps 12, 16 are operating, a peroxide solution from source 18 may be injected into an aqueous fluid stream flowing through fluid conduit 20 so as to generate a dilute peroxide stream. After injecting the peroxide solution into the aqueous fluid stream, the combined components may be mixed together using a mixer 23. In other examples, however, the system may not include a mixer.

System 10 in FIG. 1 also includes a reactor 24. Reactor 24 may contain a catalyst that is configured to chemically decompose peroxide from peroxide source 18 into oxygen and another molecule, such as water. Fluid conduit 20 is fluidly connected to reactor 24 to carry the aqueous stream containing peroxide to the reactor. As the aqueous stream containing the peroxide passes over and, in some examples, through the reactor, the peroxide in the aqueous stream may decompose and release oxygen (e.g., $O_2$). This oxygen generated in the reactor may enter the aqueous stream carrying the peroxide in the form of dissolved oxygen. When this occurs, the dissolved oxygen concentration of the aqueous stream may increase within reactor 24 so that the concentration of dissolved oxygen in the aqueous stream exiting the reactor via fluid conduit 25 is greater than the concentration in the aqueous stream entering the reactor via fluid conduit 22.

System 10 also includes an assortment of valves (26, 28, 30) and other fluid conduits that control fluid movement through the system. A processor 32 manages the overall operation of system 10. Processor 32 may be communicatively coupled to various components within system 10, for example via a wired or wireless connection, so as to send and receive electronic control signals and information between processor 32 and the communicatively coupled components. For example, processor 32 may electronically actuate valves (26, 28, 30) to open/close the valves and control pumps 12, 16 to control fluid movement through the system.

Although FIG. 1 illustrates one particular arrangement of a dissolved oxygen generation system, it should be understood that this is only one example. The disclosure is not limited to a dissolved oxygen generation system having any particular configuration, much less the particular configuration of FIG. 1. For example, although the peroxide from peroxide source 18 and aqueous fluid from fluid source 14 are generally described as being single phase liquid fluids, in other examples, one or both of the sources may contain or be a different phase. For instance, peroxide from peroxide source 18 may be a solid or a gas. In such examples, peroxide delivery pump 16 can be replaced with a different type of metering device configured to deliver the gas and/or solid agent to an intended discharge location.

To initiate generation of dissolved oxygen using the system of FIG. 1, processor 32 may receive a request specifying preparation of a dissolved oxygen stream. In response to the request, processor 32 can control system 10 to generate the requested dissolved oxygen stream. For example, processor 32 can initiate generation of a dissolved oxygen stream by opening valve 26 and activating aqueous fluid pump 12 to draw fluid from aqueous fluid source 14 and convey the fluid to reactor 24. Processor 32 can also open valve 28 and activate peroxide fluid pump 16 to control addition of peroxide into the aqueous fluid stream. When peroxide from peroxide source 18 combines with aqueous fluid from aqueous fluid source 14, the aqueous fluid may dilute the concentration of peroxide from the peroxide source. For this reason, the combined streams may be referred to as a dilute peroxide stream, which has a concentration of peroxide. Upon passing through reactor 24, the peroxide in the dilute peroxide stream may decompose, releasing oxygen that is dissolved in the aqueous stream.

System 10 can control the amount of oxygen dissolved in an aqueous fluid from aqueous fluid source 14 and, correspondingly, the concentration of dissolved oxygen in an aqueous fluid stream exiting reactor 24 via fluid conduit 25. In some examples, system 10 controls the amount of oxygen dissolved in an aqueous fluid stream by controlling the amount of peroxide added to the fluid stream from peroxide source 18. In general, increasing the amount of peroxide added to the fluid stream increases the amount of oxygen generated in reactor 24, while decreasing the amount of peroxide added to the fluid stream decreases the amount of oxygen generated in the reactor.

In one example, processor 32 of system 10 controls the addition of peroxide from peroxide source 18 to an aqueous fluid stream received from aqueous fluid source 14 and flowing through fluid conduit 20. Processor 32 may control addition of the peroxide so that the amount of peroxide added to the aqueous fluid stream is effective to increase the concentration of dissolved oxygen in the stream without exceeding a dissolved oxygen saturation limit for the stream. For example, processor 32 may control addition of an amount of peroxide to the aqueous stream that, when catalytically decomposed within reactor 24, results in the aqueous stream having a dissolved oxygen concentration below the dissolved oxygen saturation limit for the stream.

The dissolved oxygen saturation limit for a fluid is generally considered the maximum amount of oxygen that can be solubilized in the fluid. For example, it may be the maximum amount of free (e.g., not covalently bound) oxygen carried and retained by the fluid. When additional oxygen is added to the fluid beyond the dissolved oxygen saturation limit, the oxygen cannot be solubilized by the fluid. Instead, in these situations, the oxygen discharges from the fluid, e.g., in the form of gas bubbles containing gaseous oxygen that are not dissolved in the fluid surrounding the gas bubbles.

A variety of factors can influence the solubility of oxygen in a fluid. For example, the dissolved oxygen saturation limit for the fluid may be affected by the partial pressure of the gas (e.g., oxygen) in contact with the aqueous fluid, the temperature of the fluid, and the pressure of the fluid. In general, increasing the partial pressure of the gas in the fluid, increasing the pressure of the aqueous fluid, or decreasing the temperature of the aqueous fluid increases the solubility of the gas in the fluid.

Mathematically, the solubility of oxygen in an aqueous fluid can be represented by Henry's Law according to the following equation: $p=k_h \times c$. In this equation, p is the partial pressure of the gas, c is the solubility concentration for the gas, and $k_h$ is Henry's constant for the gas. In the case where oxygen is the only gas in contact with the water (e.g., as may be experienced within reactor 24), the partial pressure of the gas is equal to the total fluid pressure. At standard temperature and pressure (STP) conditions (e.g., zero degrees Celsius and 100 kPa), the Henry's constant for oxygen is typically reported as 0.024 liters-atmospheres/milligram. Accordingly, using this Henry's constant value, the maximum solubility of oxygen at one atmosphere is calculated as being 41.6 milligrams/liter (i.e., 1 atm/0.24 L-atm/mg) according to the foregoing equation.

During operation of system 10, processor 32 can control the amount of peroxide added to an aqueous stream so that the resulting amount of oxygen generated by decomposition of the peroxide does not exceed the solubility limit for the stream (e.g., does not exceed 41.6 milligrams/liter at one atmosphere of pressure). When the amount of oxygen generated by system 10 exceeds the solubility limit for the aqueous stream, excess oxygen may phase separate into a gas phase that is not dispersed within the aqueous stream.

The amount of peroxide that can be added to the aqueous stream and yet not result in the generation of excess oxygen exceeding the dissolved oxygen saturation limit of the stream will vary, among other factors, on the specific composition of the peroxide introduced into the stream. Any suitable peroxide can be used in system 10, and selection of a particular peroxide or combination of peroxides may depend, for example, on the compatibility of the peroxide reaction products (i.e., decomposition products) with a subsequent intended use of the oxygenated stream. For example, in applications where system 10 is used to increase the dissolved oxygen concentration in a water stream that is subsequently going to be used for human consumption, aquaculture, hydroponics, or the like, the peroxide decomposition products remaining in the aqueous stream should be compatible with the safe end use of the stream.

In general, any peroxides can be used in system 10. Peroxides encompass compounds containing a divalent oxygen bond (—O—O—) capable of cleaving and forming oxygen free-radicals. Example peroxides include, but are not limited to, compounds containing an oxygen-oxygen single bond of the type: R1-O—O—R2, where R1 and R2 may be hydrogen, alkyl groups, ketones, R-carbonyls, aromatic groups, or any combination thereof. For example, hydrogen peroxide (H—O—O—H) is type of peroxide that can be used in system 10 to increase a dissolved oxygen concentration in an aqueous fluid in the system. Hydrogen peroxide decomposes to oxygen according to the following reaction:

$$2H_2O_2 \rightarrow 2H_2O + O_2$$

Accordingly, when processor 32 controls introduction of hydrogen peroxide into an aqueous fluid stream in system 10, two moles of hydrogen peroxide may be added to the stream for every mole of dissolved oxygen targeted to be added to the stream. Processor 32 may determine the amount of hydrogen peroxide that can be added to the aqueous fluid stream without exceeding the dissolved oxygen saturation limit for the stream according to the following equation:

$$\text{Amount } H_2O_2 = O_2 \text{ Sat. Limit} * (1/\text{mol. wt } O_2) * \text{Stoichiometric Ratio}_{H2O2\_O2} * \text{mol wt. } H_2O_2$$

In the equation above, "Amount $H_2O_2$" is the amount of hydrogen peroxide to be added to the stream, "mol. wt $O_2$" is the molecular weight of oxygen (e.g., 32 g/mol), "Stoichiometric Ratio$_{H2O2\_O2}$" is the stoichiometric ratio of hydrogen peroxide to oxygen (i.e., 2), and "mol wt. $H_2O_2$" is the molecular weight of hydrogen peroxide (e.g., 34 g/mol). As one example, if the aqueous stream from source 14 contains no dissolved oxygen, the amount of hydrogen peroxide that may be added to the stream at STP without exceeding the dissolved oxygen saturation limit for the stream may be calculated as follows:

$$\text{Amount } H_2O_2 = (0.0416 \text{ grams } O_2/\text{liter}) * (1 \text{ mol}/32 \text{ g } O_2) * (2) * (34 \text{ g } H_2O_2/\text{mol}) = 88.4 \text{ mg } H_2O_2/\text{liter}$$

If the density of the aqueous fluid stream is assumed to be 1 kg/liter, the above calculation converts to a hydrogen peroxide concentration of 88.4 weight parts hydrogen peroxide per liter of aqueous fluid. Of course, this also assumes that all of the hydrogen peroxide added to the aqueous stream will catalytically decompose in reactor 24 to oxygen (e.g., 100% reactor efficiency). In practice, some of the peroxide added to the aqueous stream may not decompose in the reactor but may instead pass through the reactor without decomposing. To compensate for peroxide that does not decompose to generate oxygen, processor 32 may control introduction of an additional amount of peroxide to the aqueous stream (e.g., an amount above the 88.4 mg/liter) so that the amount of peroxide is effective to generate a target amount of dissolved oxygen desired for the aqueous stream. For example, in instances in which some of the hydrogen peroxide added to the aqueous stream does not decompose to generate oxygen, processor 32 may control introduction of an additional amount of hydrogen peroxide to compensate for the amount of hydrogen peroxide that does not catalytically decompose.

In response to receiving a request to generate a dissolved oxygen stream, processor 32 can control addition of peroxide from source 18 to aqueous fluid from source 14. The amount of peroxide added to the aqueous fluid can be controlled to increase the concentration of dissolved oxygen in the fluid without exceeding a dissolved oxygen saturation limit for the fluid. The target amount of dissolved oxygen to be added to the fluid—and corresponding the target amount of peroxide necessary to add to the fluid to generate the target amount of dissolved oxygen—may vary depending on the intended use of the aqueous fluid, the oxygen saturation limit of the fluid, etc.

In some examples, system 10 includes a sensor (not illustrated) communicatively coupled to processor 32 and configured to determine a concentration of gas (e.g., oxygen, nitrogen, carbon dioxide) already in the aqueous fluid from source 14. In such an example, processor 32 may determine a dissolved oxygen saturation limit for the fluid based on data from the sensor indicative of the concentration of gas in the fluid. Processor 32 may further determine a concentration of peroxide to add to the fluid source to achieve a target dissolved oxygen concentration without exceeding the dissolved oxygen saturation limit. Subsequently, processor 32 can control addition of the peroxide to the aqueous fluid to achieve the determined concentration of peroxide.

In some examples, system 10 generates an amount of oxygen sufficient so that the concentration of dissolved oxygen in the aqueous fluid exiting reactor 24 via fluid conduit 24 contains less than 100 wppm weight part per million (wppm) dissolved oxygen, such as less than 95 wppm, less than 90 wppm, less than 85 wppm, less than 75 wppm, less than 60 wppm, less than 50 wppm, less than 20 wppm, or less than 10 wppm. For example, the dissolved oxygen concentration may range from approximately 2 wppm to approximately 85 wppm, such as from approximately 5 wppm to approximately 10 wppm, approximately 10 wppm to approximately 40 wppm, or approximately 30 wppm to approximately 70 wppm.

In some examples, the dissolved oxygen concentration in the aqueous fluid exiting reactor 24 is controlled so that the dissolved oxygen concentration does not exceed the dissolved oxygen saturation limit for the fluid. In one example, the dissolved oxygen concentration is controlled so that the aqueous fluid exiting reactor 24 is equal to the dissolved oxygen saturation limit for the fluid (i.e., the fluid is saturated with dissolved oxygen). In other examples, the dissolved oxygen concentration is controlled so that the concentration of dissolved oxygen in the aqueous fluid exiting reactor 24 is below the dissolved oxygen saturation limit for the fluid by a certain amount. For example, the concentration of dissolved oxygen in the fluid may be at least 1 wppm below the dissolved oxygen saturation limit for the fluid, such as at least 3 wppm, at least 5 wppm, at least 10 wppm, at least 20 wppm, from approximately 1 wppm to approximately 50 wppm, or from approximately 3 wppm to approximately 30 wppm.

The dissolved oxygen concentration of the aqueous fluid can be controlled by controlling the amount of peroxide added to the stream, e.g., as outlined above. The amount of peroxide added to the fluid will vary depending, e.g., on the target dissolved oxygen concentration for the fluid, the concentration of oxygen already in the fluid, and the dissolved oxygen saturation limit for the fluid. In some examples, the amount of peroxide added to the fluid is effective to yield a peroxide concentration in the fluid of less than 0.01 weight percent (100 wppm), such as less than 0.0095 weight percent, less than 0.009 weight percent, less than 0.008 weight percent, less than 0.005 weight percent, or less than 0.0025 weight percent. For example, the amount of peroxide added to the fluid may be effective to yield a peroxide concentration ranging from 0.0001 weight percent (10 wppm) to 0.001 weight percent, such as from 0.00025 weight percent to 0.00095 weight percent, or from 0.005 weight percent to 0.0085 weight percent.

During operation of system 10, a dilute peroxide stream is generated by introducing peroxide from source 14 into an aqueous fluid stream from source 18. Once combined, the dilute peroxide stream is conveyed to reactor 24 to catalytically decompose the peroxide in the stream. In some examples, system 10 also includes a mixer configured to mix the peroxide with the aqueous fluid stream. For example, system 10 in FIG. 1 includes mixer 23. Mixer 23 may be any type of mixer that is positioned to mix aqueous fluid supplied from source 14 with peroxide supplied from source 18. In different examples, mixer 23 may be an inline mixer, offline mixer, static mixer, or active mixer.

Mixer 23 may interact with a fluid stream flowing through fluid conduit 20 so as to homogenize the contents of the fluid stream. For example, mixer 23 may impart turbulence to the fluid stream so that peroxide and water in the fluid stream homogenously mix. The amount of mixing imparted by mixer 23 may be effective so that localized areas (e.g., pockets) of comparatively high concentration peroxide in the fluid stream (if any) are effectively eliminated from the fluid stream. For example, the amount of mixing imparted by mixer 23 may be effective to substantially eliminate and, in some examples, completely eliminate, any localized areas of comparatively high concentration peroxide in the fluid stream. The fluid stream may be sufficiently mixed so that no portion (e.g., cross-sectional area) of the fluid stream discharged from mixer 23 contains a higher concentration of peroxide than any other portion of the fluid stream.

Effectively mixing the dilute peroxide stream prior to introducing the stream into reactor 24 may be useful to prevent localized pockets of high concentration peroxide from decomposing within the reactor. As discussed above, processor 32 may control addition of the peroxide so that the amount of peroxide added to the aqueous fluid is effective to increase the concentration of dissolved oxygen in the stream without exceeding a dissolved oxygen saturation limit for the stream. As peroxide is combined with the aqueous fluid in practice, however, localized pockets of high concentration peroxide may form having a higher concentration of peroxide than the bulk dilute peroxide solution. If these pockets of comparatively high concentration peroxide enter reactor 24 and catalytically decompose, they may produce localized amounts of oxygen that exceed the dissolved oxygen saturation limit for the fluid. When this occurs, the excess oxygen generated in these localized areas may form gaseous oxygen bubbles. The gaseous oxygen bubbles can exit out of the fluid stream (e.g., without absorbing while passing through regions of the fluid stream containing oxygen below the dissolved oxygen saturation limit), creating a source of oxygen inefficiency in the system. For these and other reasons, system 10 may include mixer 23 to homogenously mix the peroxide with the aqueous fluid.

Independent of whether system 10 includes mixer 23, peroxide added to aqueous fluid from source 14 is conveyed to reactor 24 via fluid conduit 20. Reactor 24 may be any suitable type of reactor that contains catalyst for dissolving the peroxide carried by the aqueous fluid. In one example, reactor 24 is an enclosed reaction chamber having a fluid inlet, a fluid outlet, and containing catalyst inside of the reaction chamber. For example, reactor 24 may be a fluidized bed reactor in which particles of catalyst are contained inside the reactor and are fluidized as aqueous fluid moves through the reactor. As another example, reactor 24 may be a support surface (e.g., an electrode plate, a side wall of a pipe) that contains catalyst adhered to the surface. As the aqueous fluid comes in contact with the surface, for example by flowing over the surface, the catalyst carried by the surface can interact with the peroxide to catalytically decompose the peroxide.

The catalyst within reactor 24 can catalyze decomposition of the peroxide by lowering the activation energy of the decomposition reaction. Substantially all of the peroxide added to and/or contained within an aqueous fluid entering reactor 24 may catalytically decompose within the reactor. For example, greater than 50 weight percent of the peroxide added to and/or contained in the aqueous stream from source 14 may decompose in reactor 24, such as greater than 75 weight percent, greater than 90 weight percent, greater than 95 weight percent, or greater than 99 weight percent.

Any suitable type of catalyst can be used in reactor 24. In some examples, the catalyst includes a metal oxide such as a mixed metal oxide. A mixed metal oxide catalyst may be a catalyst having oxides of at least two different types of metal atoms (or a metal atom having at least two different charge states). For example, a mixed metal oxide catalyst may be a mixture of two or more different types of metal oxides having the general formula $A_wO_x$ and $B_yO_z$, where A and B represent first and second metallic elements, O is oxygen, and w, x, y, and z are >0. Alternatively, the mixed metal oxide catalyst may be a molecule formed of two or more different types of metallic elements atomically bonded with oxygen having the general formula $A_xB_yO_z$, where A and B represent first and second metallic elements, O is oxygen, and x, y, and z are >0.

One type of mixed metal oxide catalyst that may be used to decompose a peroxide in an aqueous fluid is a perovskite. The term "perovskites" refers to a class of compounds with the same crystal structure and having the chemical formula $ABX_3$, where A and B represent first and second metallic elements and X represents oxygen. Both calcium and barium titanate are examples of this type of mixed oxide. Accordingly, in some examples, the catalyst in reactor 24 includes a perovskite.

Another type of mixed metal oxide catalyst that may be used to decompose a peroxide in an aqueous fluid is a spinel. The term "spinels" refers to compounds with the formula $AB_2O_4$, where A and B represent first and second metallic elements and O represents oxygen. For example, "A" may be one of Mg, Mn, Fe, Ni, Zn, and "B" may be one of Al, Co, Fe. One example of a spinel is $MgAl_2O_4$. Another example of a spinel is a ferrite having the general formula $MFe_2O_4$, where M is selected from the group consisting of Mg, Mn, Co, Ni and Zn. Other compounds having a spinel structure include $ZnAl_2O_4$, $FeAl_2O_4$, magnetite ($Fe_3O_4$) and nickel cobaltite ($NiCo_2O_4$). Accordingly, in some additional examples, the catalyst in reactor 24 includes a spinel.

Independent of the specific type of catalyst selected for reactor 24, the catalyst may have a comparatively high surface area and/or comparatively low porosity. For example, the catalyst may have a surface area greater than 5 square meters/gram as measured via mercury porosimetry, such as greater than 7 square meters/gram, or greater than 10 square meters per gram. A catalyst that has a high surface area and/or low porosity may help prevent the formation of gaseous oxygen bubbles in system 10 that can lead to a loss of generated oxygen. For example, a high surface area and/or low porosity catalyst may help decompose peroxide in the aqueous fluid so that oxygen generated on the surface of the catalyst solubilizes immediately within the surrounding fluid without ever going to a gaseous state.

In some examples, the system is configured to utilize a relatively large amount of catalyst to decompose a relatively small amount of peroxide so as to efficiently generate dissolved oxygen. For example, in contrast to using an excessive peroxide loading in conjunction with a small amount of catalyst, system 10 may utilize a large amount of catalyst but a relatively smaller amount of consumable peroxide. In some examples, a ratio of peroxide by weight to catalyst surface area may be less than $5 \times 10^{-5}$ grams per hour per square meter of catalyst surface area, such as less than $3 \times 10^{-5}$ grams per hour per square meter of catalyst surface area (e.g., approximately $2.3 \times 10^{-5}$ grams per hour per square meter of catalyst surface area).

In some examples, reactor 24 generates oxygen so that substantially all (and in some examples all) oxygen generated by decomposition of peroxide dissolves in the surrounding aqueous fluid carrying the peroxide. Peroxide decomposition may occur as individual peroxide molecules contact the surface of the catalyst in reactor 24. As oxygen is released at the surface of the catalyst during this reaction, the oxygen may solubilize in the surrounding aqueous fluid without first generating a gaseous oxygen bubble that is than absorbed into the aqueous fluid. Additionally or alternatively, oxygen generated at the surface of the catalyst may form small dimension oxygen bubbles that are readily absorbed into the surrounding aqueous fluid. To the extent gaseous bubbles form, for example, the bubbles may have a mean diameter less than 1000 nanometers (nm), such as less than 500 nm, less than 100 nm, or less than 50 nm. System 10 may control the generation of oxygen bubbles, e.g., by controlling the concentration of peroxide introduced into the reactor.

If large gaseous oxygen bubbles form during decomposition of peroxide, the large bubbles may travel through the surrounding aqueous fluid without absorbing in the fluid. In the case of spherical gas bubbles, the ratio of surface area to volume is inversely proportional to the diameter of the bubble. This means that as the bubble grows in size, there is comparatively less bubble surface area at the gas-liquid interface for the gas to absorb in the liquid. If larger gas bubbles pass out of the surrounding fluid without absorbing, the gas in the bubbles may be lost to the surrounding atmosphere.

In some examples, peroxide in the dilute peroxide stream passing through reactor 24 catalytically decomposes without generating any visible gas bubbles visible to the unaided human eye (e.g., not visible without a microscope). When this occurs, an individual looking at a fluid stream in reactor 24 or exiting the reactor via fluid conduit 25 may not see any visible gas bubbles that are phase separated from the bulk liquid fluid stream and bubbling out of the liquid fluid. Were such gaseous oxygen bubbles to form, the bubbles may represent lost oxygen that is not dissolved in the surrounding liquid.

Operating conditions within reactor 24 may vary, e.g., depending on the type of catalyst used in the reactor and desired reaction rates. In some examples, the temperature in the reactor during operation is less than 100 degrees Celsius, such as less than 75 degrees Celsius, less than 50 degrees Celsius, or less than 25 degrees Celsius. For example, the temperature of the aqueous fluid inside the reactor during reaction may range from approximately 5 degrees Celsius to approximately 50 degrees Celsius, such as from approximately 10 degrees Celsius to approximately 30 degrees Celsius. For example, reactor 24 may receive a dilute peroxide stream that is at ambient temperature (e.g., from approximately 10 degrees Celsius to approximately 30 degrees Celsius) and discard a stream containing an increased concentration of dissolved oxygen that is also at ambient temperature. Increasing the temperature of the fluid streams and/or temperature inside reactor 24 may decrease the dissolved oxygen saturation limit for the streams. Accordingly, the temperature may be minimized to increase the dissolved oxygen saturation limit. Although not illustrated in the example system 10 of FIG. 1, processor 32 may be communicatively coupled to a heat exchanger, heater, and/or cooler to adjust the temperature of fluid flowing through fluid conduit 20 and entering reactor 24.

The pressure of the dilute peroxide stream entering reactor 24, and the pressure inside the reactor during reaction, may be controlled, e.g., by controlling the amount of pressure generated pumps 12, 16 and/or electronically controlling valves (20, 28, 30) so as increase or decrease flow through the fluid conduits and reactor 24. In some examples as described in greater detail below with respect to FIG. 2, the pressure of the dilute peroxide stream entering reactor 24 and/or the pressure inside the reactor during reaction may be greater than atmospheric pressure. In other examples, the pressure of the dilute peroxide stream entering reactor 24 and/or the pressure inside the reactor during reaction may be approximately equal to atmospheric pressure (e.g., +/−5 psig, +/−2 psig).

Aqueous fluid source 14 may be any source providing fluid that includes water (or, optionally, consists or consists essentially of water). In one example, aqueous fluid source 14 is a pressurized water main (e.g., city water main). In another example, aqueous fluid source 14 is a well from which subterranean water is extracted. In another example, aqueous fluid source 14 is a waste water treatment reservoir containing waste water to be treated. In yet another example, aqueous fluid source 14 is a hydroponic growing reservoir containing water in which plants are cultivated. In still another example, aqueous fluid source 14 is an aquatic animal reservoir in which aquatic animals are stored and/or grown.

Processor 32 can control flow through reactor 24 by controlling pumps 12, 16 and valves (26, 28, 30). Aqueous fluid discharging from reactor 24 via fluid conduit 25 may have an increased concentration of dissolved oxygen as compared to the fluid entering the reactor. The aqueous fluid stream with the increased concentration of dissolved oxygen may be discharged to any suitable downstream location and be used for any application where aqueous fluid with dissolved oxygen is desired. In some examples, aqueous fluid extracted from source 14 is returned to the source (e.g., via fluid conduit 32) after discharging from reactor 24. For example, where it is desired to increase the concentration of dissolved oxygen in a water reservoir, a portion of the water can be drawn from the reservoir, processed in system 10 to increase the concentration of dissolved oxygen in the portion of water, and then returned to the reservoir.

Peroxide source 18 can contain and/or provide any suitable types of peroxides, as herein. Peroxide source 18 may be a reservoir (e.g., a tank, a tote, a bottle, a box) containing peroxide generated at a facility physically remote from the location of system 10. Alternatively, peroxide source 18 may be a peroxide generator that generates peroxide at the same location where system 10 is located. As one example, electrochemical technology can be used to generate the peroxide on-site. In such examples, the purchase, transportation and storage of concentrated solutions of peroxide (e.g., hydrogen peroxide) can be avoided. Further, since electrolytic peroxide generators typically generate low concentrations of peroxide (e.g., hydrogen peroxide) at reasonable current efficiency, the generators may be well suited to applications in which a relatively dilute peroxide solution is catalytically decomposed to generate oxygen.

To generate hydrogen peroxide on-site, system 10 may include an electrochemical cell supplied with a proton source and oxygen source. Oxygen may be reduced electrochemically in an electroreduction process that utilizes a gas diffusion electrode as the cathode in the electrochemical cell. This electrode may have a structure, formed using a carbon black or an activated carbon and Teflon, to provide a multiplicity of three phase boundaries (comprising oxygen, electrolyte, and catalyst) at which the reduction process occurs to form hydrogen peroxide and hydroxide ions. The anode in the cell may be a mixed metal oxide electrode, at which oxygen is evolved together with protons. Diffusion of protons and hydroxide ions into the bulk electrolyte can control the pH of the solution. The electrodes in the electrochemical cell may be separated only by electrolyte or the cell may include a porous diaphragm or an ion exchange membrane as a separator, creating a two compartment configuration. The oxygen gas may be supplied to the cathode from air, gas cylinders or oxygen concentrators such as vacuum or pressure swing adsorption (VSA/PSA). The electrolyte may be purified water that is softened to avoid precipitation of hardness into the pores of the gas diffusion electrode. If air is used as the source of oxygen, carbon dioxide levels in the air may be reduced, e.g., by using caustic scrubbers.

Components described as pumps (12, 16) may be any suitable fluid pressurization device such as a direct lift pump, positive displacement pump, velocity pump, buoyancy pump and/or gravity pump or any combination thereof. Processor 32 may control the amount of peroxide introduced into aqueous fluid from fluid source 14, e.g., by starting and/or stopping pump 12/16 or increasing and/or decreasing the rate of pump 12/16 to adjust the concentration of peroxide flowing through fluid conduit 20.

In general, components described as valves (26, 28, 30) may be any device that regulates the flow of a fluid by opening or closing fluid communication through a fluid conduit. In various examples, a valve may be a diaphragm valve, ball valve, check valve, gate valve, slide valve, piston valve, rotary valve, shuttle valve, and/or combinations thereof. Each valve may include an actuator, such as a pneumatic actuator, electrical actuator, hydraulic actuator, or the like. For example, each valve may include a solenoid, piezoelectric element, or similar feature to convert electrical energy received from processor 32 into mechanical energy to mechanically open and close the valve. Each valve may include a limit switch, proximity sensor, or other electromechanical device to provide confirmation that the valve is in an open or closed position, the signals of which are transmitted back to controller 30.

Fluid conduits in system 10 may be pipes or segments of tubing that allow liquid to be conveyed from one location to another location in the system. The material used to fabricate the conduits should be chemically compatible with the liquid to be conveyed and, in various examples, may be steel, stainless steel, or a polymer (e.g., polypropylene, polyethylene).

Figure 2:
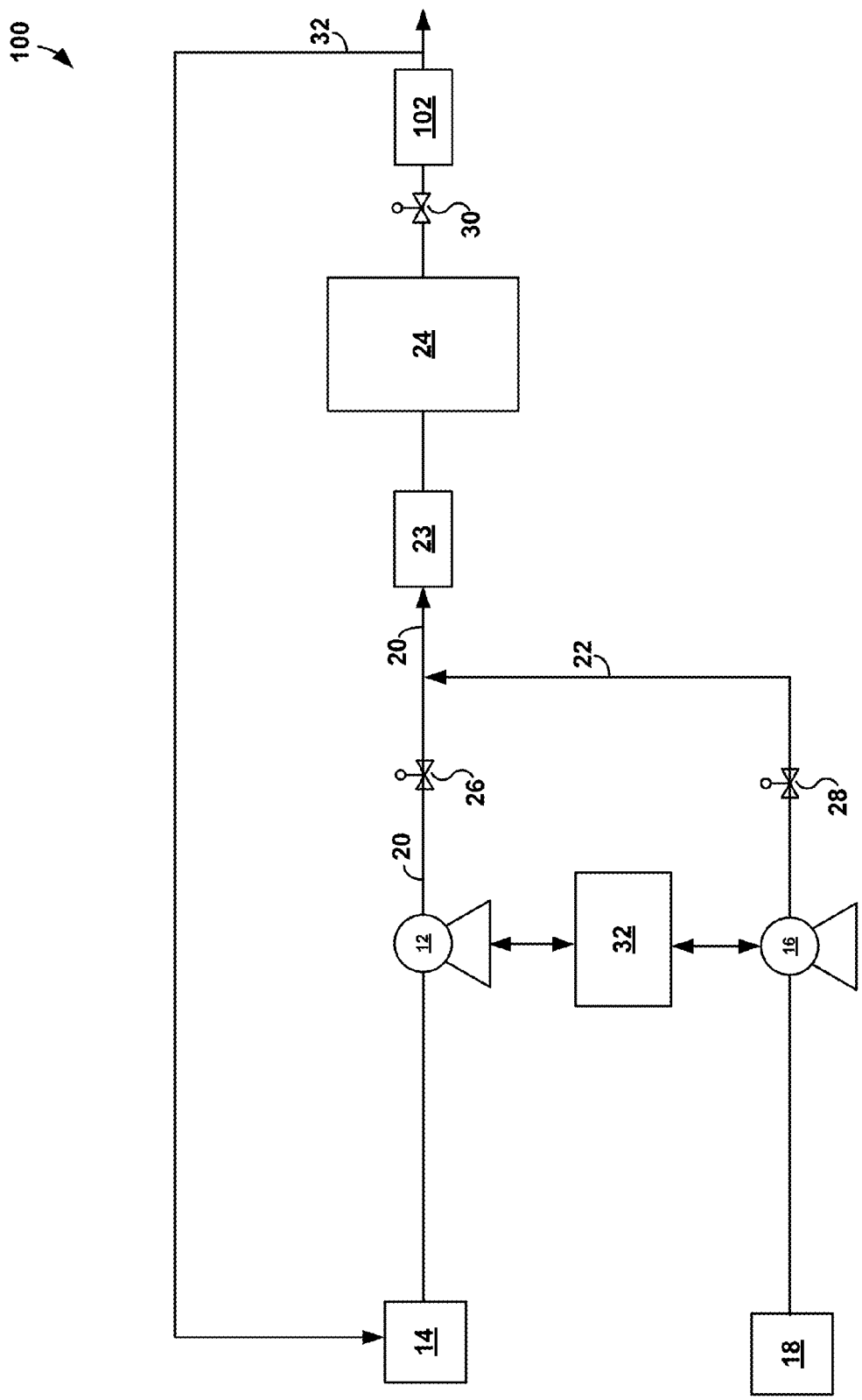
FIG. 2 is an illustration of another example dissolved oxygen generation system.

FIG. 2 is an illustration of another example dissolved oxygen generation system 100. Dissolved oxygen generation system 100 is the same as dissolved oxygen generation system 100 of FIG. 1 except that system 100 further includes a pressure reducer 102. System 100 may be used to generate dissolved oxygen under high pressure (e.g., above atmospheric pressure) conditions. For example, processor 32 may control pump 12 and/or 16 to generate a dilute peroxide stream having an elevated pressure. The dilute peroxide stream can enter reactor 24 at the elevated pressure so that the catalytic decomposition reaction occurs at an elevated pressure. After exiting reactor 24, the resulting stream having an increased concentration of dissolved oxygen can be reduced in pressure via pressure reducer 102 to pressure suitable for an intended downstream application.

As briefly discussed above, the dissolved oxygen saturation limit of an aqueous fluid can be affected by several factors, including the pressure of the fluid. Increasing the pressure of the aqueous fluid can increase the dissolved oxygen saturation limit of the fluid. For example, Henry's Law specifies that solubility of oxygen in an aqueous fluid is linearly proportional to the partial pressure of the gas in the fluid. In the case where oxygen is the only gas in contact with the water (e.g., as may be experienced within reactor 24), the partial pressure of the gas is equal to the total fluid pressure. Accordingly, increasing the pressure of the aqueous fluid may result in a corresponding linear increase in the dissolved oxygen saturation limit for the fluid. That is, doubling the pressure of the aqueous fluid may double the dissolved oxygen saturation limit for the fluid, tripling the pressure of the aqueous fluid may triple the dissolved oxygen saturation limit for the fluid, and so forth.

During operation, processor 32 may control system 10 to increase the pressure of the dilute peroxide fluid inside reactor 24 and thereby increase the dissolved oxygen saturation limit for the fluid. Processor 32 may control the pressure, e.g., by controlling pump 12 and/or 16 and/or opening and/or closing valves (26, 28, 30). In addition to increasing the dissolved oxygen saturation limit of the fluid, processor 32 may further control the amount of peroxide added to an aqueous stream so that the resulting amount of oxygen generated by decomposition of the peroxide does not exceed the solubility limit for the stream. Because the solubility limit for the fluid is increased by pressurization, however, processor 32 can introduce more peroxide into the aqueous stream without exceeding the solubility limit than if the stream were at a comparatively lower pressure.

Increasing the pressure of the aqueous stream to increase the dissolved oxygen saturation limit of the aqueous stream may be useful for a variety of reasons. As one example, increasing the dissolved oxygen saturation limit of the aqueous stream may be useful where the stream exiting reactor 24 (e.g., via fluid conduit 25) is not reduced down to atmospheric pressure but instead is used at an elevated pressure. In this situation, the amount of dissolved oxygen that can be carried by the higher pressure stream is greater than if the stream were at a comparatively lower pressure. Accordingly, increasing the pressure of the aqueous fluid in system 10 prior to and/or within reactor 24 can allow additional oxygen to be dissolved in the stream consistent with the downstream pressure.

As another example, increasing the dissolved oxygen saturation limit of the aqueous stream can increase the driving force, and hence rate, at which oxygen dissolves in the stream. As oxygen begins transferring (e.g., dissolving) into a surrounding aqueous fluid during operation of system 10, the actual concentration of oxygen in the fluid increases, which decreases the driving force and slows the transfer rate at which subsequent molecules of oxygen can dissolve in the fluid. As the concentration of dissolved oxygen in the aqueous fluid approaches the maximum saturation, the transfer rate asymptotically approaches zero. This means that the final amounts of oxygen (e.g., the final 5 ppm, final 3 ppm, final 1 ppm) required to achieve dissolved oxygen saturation take longer to dissolve in the aqueous fluid than the initial amounts of oxygen dissolved in the fluid.

By increasing the dissolved oxygen saturation limit of the aqueous fluid, the driving force at which dissolved oxygen saturates in the fluid at lower concentrations may be increased. That is, even if a lower amount of oxygen is dissolved in the stream than would be possible given an increased dissolved oxygen saturation limit, the oxygen may dissolve more readily in the stream because of the increased dissolved oxygen saturation limit.

For example, assume that the dissolved oxygen saturation limit of an aqueous fluid is 85 wppm at atmospheric pressure and it is desired to increase the dissolved oxygen concentration of the fluid to 80 wppm. Were oxygen to be dissolved in the fluid at atmospheric pressure, the final amounts of oxygen introduced into the fluid as the saturation limit is approached may dissolve comparatively slowly (e.g., while increasing the concentration from 75 wppm to 80 wppm). By contrast, if the pressure of the aqueous fluid was increased by, e.g., a factor of three, the dissolved oxygen saturation limit may correspondingly increase (e.g. up to 255 wppm). When still targeting to increase the dissolved oxygen concentration of the fluid to 80 wppm, the final amounts of oxygen introduced into the fluid (e.g., approaching 80 wppm) under the elevated pressure conditions would then be well below the increased dissolved oxygen saturation limit of 255. Accordingly, the final amounts of oxygen needed to achieve the 80 wppm concentration may transfer into the fluid faster than if the fluid were at the comparatively lower pressure. Further, when the fluid with the increased concentration of dissolved oxygen is subsequently reduced back down to atmospheric pressure, the dissolved oxygen concentration in the fluid (e.g., 80 wppm) may be below the dissolved oxygen saturation limit for the fluid (e.g., 85 wppm). In this manner, the pressure of the aqueous fluid and/or concentration of peroxide introduced into the fluid can be controlled to increase the rate of oxygen dissolution yet ensure that the concentration of dissolved oxygen in the fluid does not exceed the dissolved oxygen saturation limit of the fluid after the fluid is reduced in pressure.

In different examples, processor 32 may control system 10 so that the pressure of the aqueous fluid into which oxygen is dissolving in reactor 24 is greater than 1 pound per square inch gauge (psig), such as greater than 2 psig, greater than 5 psig, greater than 10 psig, greater than 20 psig, greater than 50 psig, greater than 100 psig, or greater than 200 psig. For example, processor 32 may control system 10 so that the pressure ranges from 2 psig to 1000 psig, such as from 5 psig to 300 psig, from 10 psig to 300 psig, or from 20 psig to 60 psig.

Upon exiting reactor 24, the aqueous fluid whose dissolved oxygen concentration was increased may be decreased in pressure down to a pressure of a downstream application. For example, the stream may be decreased from any of the foregoing pressures or pressure ranges to a pressure less than 50 psig, such as a pressure less than 20 psig, a pressure less than 10 psig, a pressure less than 5 psig, or a pressure less than 2 psig. In one example, the pressure is reduced down to atmospheric pressure. Processor 32 can control the amount of peroxide added to an aqueous stream (e.g., as described with respect to FIG. 1) so that the amount of oxygen generated by decomposition of the peroxide does not exceed the solubility limit for aqueous fluid at the reduced pressure. That is, even though the dissolved oxygen saturation limit for the fluid may be increased during decomposition because of the elevated pressure, the amount of oxygen generated during decomposition may be controlled so that concentration of dissolved oxygen in the fluid exiting the reactor does not exceed the saturation limit at the reduced pressure. In such applications, substantially no or no oxygen may come out of dissolution (e.g., in the form of gaseous oxygen bubbles) when the pressure of the fluid is reduced.

To reduce the pressure of the aqueous stream exiting reactor 24, system 100 may include pressure reducer 102. Pressure reducer 102 may be any device that reduces the pressure of an aqueous fluid containing dissolved oxygen. In some examples, pressure reducer 102 reduces the pressure of the fluid stream exiting reactor 24 uniformly (e.g., without imparting turbulence into the fluid) so that localized areas of reduced pressure do not form during pressure reduction. For example, pressure reducer 102 may reduce the pressure of the fluid stream such that the fluid stream stays in a laminar fluid regime (e.g., Reynolds number less than 2300) and does not exhibit turbulent flow.

If the fluid stream exiting reactor 24 were to exhibit turbulent flow during pressure reduction, the turbulent flow may create localized areas (e.g., pockets) in the fluid of comparatively high pressure and others of comparatively low pressure. In some instances, the low pressure areas may even be below atmospheric pressure (i.e., at vacuum). Because the dissolved oxygen saturation limit of the fluid is proportional to the pressure of the fluid, the dissolved oxygen saturation limit may decrease in those localized areas of the fluid where low pressure is generated. This may cause the fluid to expel dissolved oxygen (e.g., by releasing gaseous oxygen bubbles) in those areas of the fluid where localized low pressure is created. If enough dissolved oxygen is expelled, the concentration of dissolved oxygen in the bulk fluid may be materially reduced.

Accordingly, in some examples, pressure reducer 102 reduces the pressure of the fluid stream so that substantially no (and, in some examples no) localized areas of reduced pressure form in the fluid having a reduced dissolved oxygen saturation limit. In one example, pressure reducer 102 is a fluid friction device that reduces pressure via frictional energy. For example, pressure reducer 102 may be a fluid conduit of sufficient length and cross-sectional area to frictionally dissipate the requisite amount of energy so as to lower the pressure without introduction turbulence. During operation, energy dissipation may be achieved by friction between the flowing solution and the conduit wall. At Reynolds numbers below 2300, flow is generally considered laminar and the turbulence (fluid on fluid friction) is minimum, while Reynolds numbers above 2300 is generally considered turbulent with fluid on fluid friction significantly influencing energy dissipation.

As another example, pressure reducer 102 may be a valve. Valves, depending on the type and construction, have varying degrees of turbulence. Diaphragm valves and tubing pinch valves may create less turbulence than so called sharp edge valves, such as ball valves, gate valves, needle valves, and plug valves.

Figure 3:
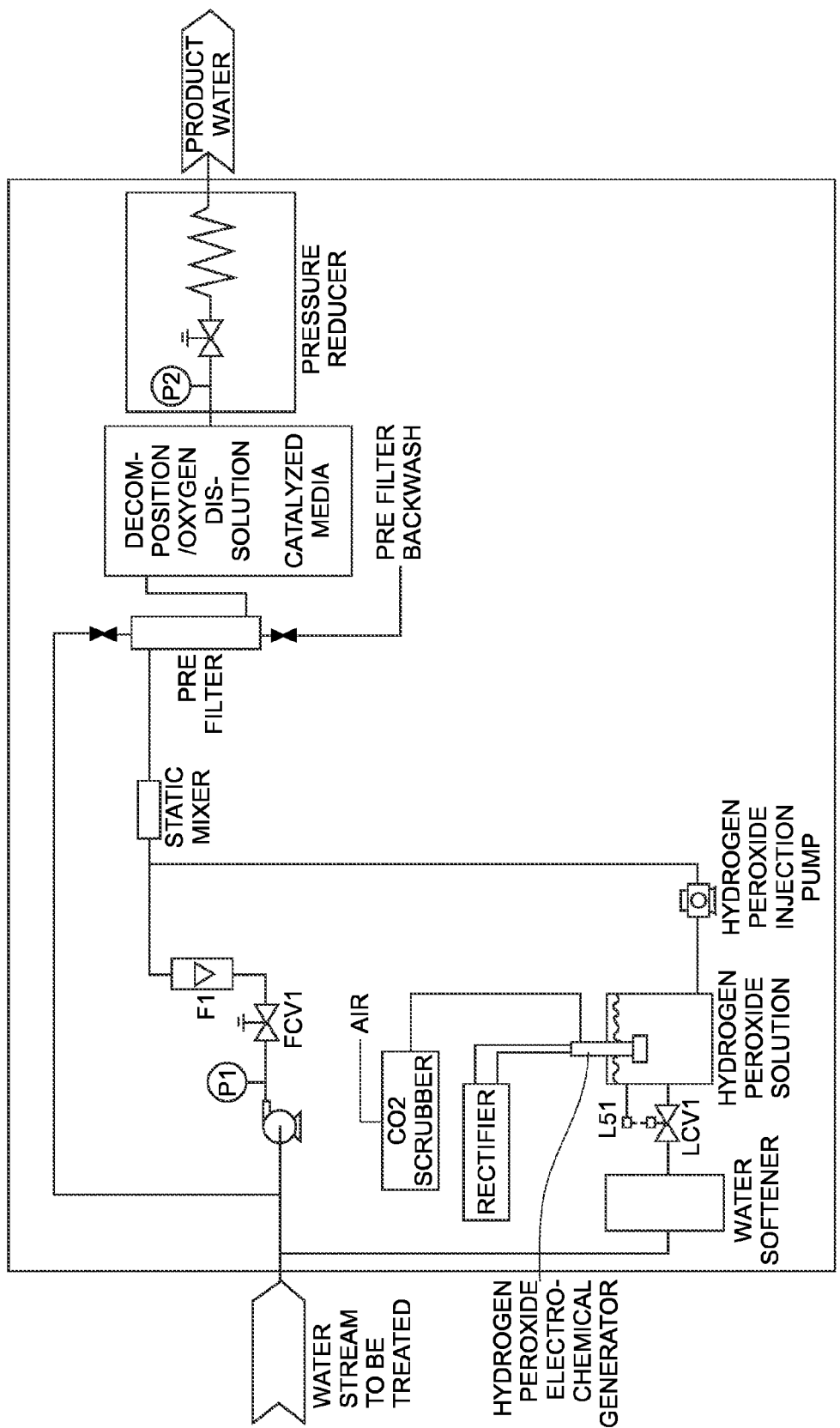
FIG. 3 is a process flow diagram showing example components, and an example arrangement of components, that may be used for dissolved oxygen generation systems of FIGS. 1 and 2.

FIG. 3 is a process flow diagram showing example components, and an example arrangement of components, that may be used for dissolved oxygen generation system 10 and 100.

The techniques described in this disclosure, including functions performed by a controller, control unit, or control system, may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" as used herein, may refer to any one or more of the foregoing structures or any other structure suitable for implementation of the techniques described herein.

The various components illustrated herein may be realized by any suitable combination of hardware, software, firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors or controllers.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices.

If implemented in part by software, the techniques may be realized at least in part by a computer-readable data storage medium (e.g., a non-transitory computer-readable storage medium) comprising code with instructions that, when executed by one or more processors or controllers, performs one or more of the methods and functions described in this disclosure. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

The following example may provide additional details about a dissolved oxygen generation system in accordance with this disclosure.

Example

Figure 4:
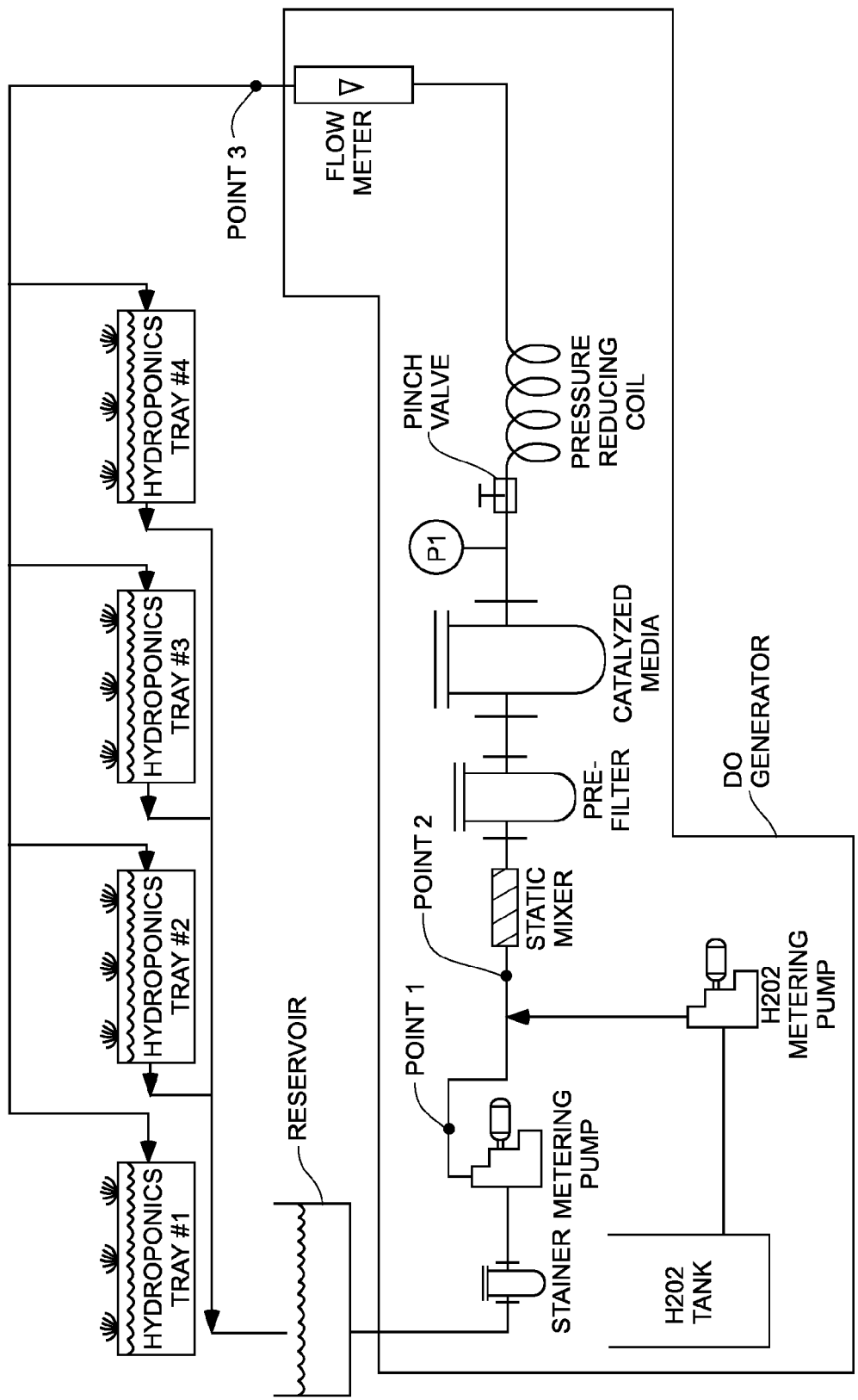
FIG. 4 is a process flow diagram showing an example dissolved oxygen generation system constructed in accordance with the disclosure.

FIG. 4 is a process flow diagram showing an example dissolved oxygen generation system constructed in accordance with the disclosure. The system utilized water from hydroponic growing trays as an aqueous fluid source and a reservoir of 1 wt % hydrogen peroxide as a peroxide source. The system includes an aqueous fluid pump that pumped the water from the hydroponic growing trays at a flow rate of 140 ml/min and a pressure of 65 PSIA. The system also included a hydrogen peroxide pump that injected hydrogen peroxide into a stream of the hydroponic water.

During one run of the system, the hydrogen peroxide pump injected an amount of hydrogen peroxide into the stream of hydroponic water sufficient to generate a dilute hydrogen peroxide stream having a concentration of 110 ppm hydrogen peroxide. The dilute hydrogen peroxide stream was passed through a static mixer to homogeneously mix the contents of the stream before entering a decomposition reactor. The reactor contained 5 liters of manganese dioxide catalyst, which appeared to completely decompose the hydrogen peroxide to generate approximately 51 ppm of dissolved oxygen. At the pressure of reaction, the 51 ppm of dissolved oxygen was above the dissolved oxygen saturation limit for the water stream.

After exiting the reactor, the water stream containing the increased concentration of dissolved oxygen was passed through a pressure reducer. In the example system, the pressure reducer was formed of a pinch valve and a length of tubing (e.g., deformable polymeric tubing). The pinch valve constricted the tubing to create a restriction that minimized the generation of turbulent flow during pressure reduction. Further, the length of tubing provided a fixed restriction that had a controlled diameter flow passage over its comparatively long length to create a gradual pressure drop.

The water stream exiting the pressure reducer maintained an increased concentration of dissolved oxygen. The water stream was returned to the hydroponic growing trays from which it was originally extracted.

The invention claimed is:

1. A process for generating dissolved oxygen comprising:
  receiving from a source a fluid stream comprising water;
  adding hydrogen peroxide to the fluid stream so as to generate a dilute hydrogen peroxide stream having a concentration of hydrogen peroxide;
  pressurizing the dilute hydrogen peroxide stream so as to increase a dissolved oxygen saturation limit of the dilute hydrogen peroxide stream and thereby provide a pressurized dilute hydrogen peroxide stream;
  passing the pressurized dilute hydrogen peroxide stream through a reactor containing catalyst so as to catalytically decompose the hydrogen peroxide into oxygen and water and thereby generate an oxygenated fluid stream having a concentration of dissolved oxygen; and reducing the pressure of the oxygenated fluid stream to a reduced pressure, wherein the concentration of dissolved oxygen in the oxygenated fluid stream prior to reducing the pressure is below a dissolved oxygen saturation limit of the oxygenated fluid stream at the reduced pressure.

2. The process of claim 1, wherein the concentration of hydrogen peroxide is less than 0.01 weight percent.

3. The process of claim 1, wherein pressurizing the dilute hydrogen peroxide stream comprises pressurizing the dilute hydrogen peroxide stream to a pressure ranging from 10 pounds per square inch (psi) to 300 psi.

4. The process of claim 1, wherein pressurizing the dilute hydrogen peroxide stream comprises pressurizing the dilute hydrogen peroxide stream to a pressure ranging from 30 psi to 150 psi, and reducing the pressure of the oxygenated fluid stream comprises reducing the pressure to a reduced pressure below 5 psi.

5. The process of claim 4, wherein the reduced pressure is atmospheric pressure.

6. The process of claim 1, wherein reducing the pressure comprises reducing the pressure of the oxygenated fluid stream uniformly so that localized areas of reduced pressure having reduced dissolved oxygen saturation limits do not form in the oxygenated fluid stream.

7. The process of claim 1, wherein reducing the pressure comprises conveying the oxygenated fluid stream through a pressure reducer while in a laminar flow regime.

8. The process of claim 1, wherein passing the pressurized dilute hydrogen peroxide stream through the reactor comprises passing the pressurized dilute hydrogen peroxide stream through the reactor at a temperature less than 100 degrees Celsius.

9. The process of claim 8, wherein the temperature ranges from 5 degrees Celsius to 50 degrees Celsius.

10. The process of claim 1, further comprising mixing the hydrogen peroxide with the fluid stream an amount effective to eliminate localized areas of high concentration hydrogen peroxide in the dilute hydrogen peroxide solution that, when catalytically decomposed, would otherwise generate localized areas of dissolved oxygen above the dissolved oxygen saturation limit.

11. The process of claim 1, further comprising generating the hydrogen peroxide in an electrochemical cell by reduction of oxygen.

12. The process of claim 1, wherein the source comprises one of a hydroponic growing reservoir, an aquatic animal farm reservoir, a well, and a waste water treatment reservoir, and further comprising returning the oxygenated fluid stream to the source.

13. The process of claim 1, wherein the catalyst includes at least one of a perovskite and a spinel.

14. A process for generating dissolved oxygen comprising:
introducing peroxide into an aqueous fluid to form a dilute peroxide solution having a concentration of the peroxide;
pressurizing the dilute peroxide solution and thereby increasing a dissolved oxygen saturation limit of the dilute peroxide solution;
subsequent to pressurizing the dilute peroxide solution, catalytically decomposing the peroxide in the dilute peroxide solution into oxygen, thereby generating dissolved oxygen and forming an oxygenated fluid; and
reducing a pressure of the oxygenated fluid and thereby decreasing the dissolved oxygen saturation limit of the oxygenated fluid,
wherein introducing the peroxide comprises introducing an amount of peroxide that, when catalytically decomposed, provides a dissolved oxygen concentration in the oxygenated fluid below the dissolved oxygen saturation limit of the oxygenated fluid after reducing the pressure.

15. The process of claim 14, wherein the peroxide comprises hydrogen peroxide and the hydrogen peroxide ranges in concentration from 0.0001 weight percent to 0.009 weight percent.

16. The process of claim 14, wherein pressurizing the dilute peroxide solution comprises pressurizing the dilute peroxide solution to a pressure ranging from 10 pounds per square inch (psi) to 300 psi.

17. The process of claim 14, wherein pressurizing the dilute peroxide solution comprises pressurizing the dilute peroxide solution to a pressure ranging from 30 psi to 150 psi, catalytically decomposing the peroxide comprises catalytically decomposing the peroxide at a temperature less than 100 degrees Celsius, and reducing the pressure of the oxygenated fluid comprises reducing the pressure to below 5 psi.

18. The process of claim 14, wherein reducing the pressure comprises reducing the pressure of the oxygenated fluid uniformly so that localized areas of reduced pressure having reduced dissolved oxygen saturation limits do not form in the oxygenated fluid.

19. The process of claim 14, wherein reducing the pressure comprises conveying the oxygenated fluid through a pressure reducer while in a laminar flow regime.

20. The process of claim 14, further comprising mixing the peroxide with the aqueous fluid an amount effective to eliminate localized areas of high concentration peroxide in the dilute peroxide solution that, when catalytically decomposed, would otherwise generate localized areas of dissolved oxygen above the dissolved oxygen saturation limit.

21. A system comprising:
a fluid source that provides a fluid stream comprising water;
a peroxide source;
a pump;
a reactor containing catalyst;
a pressure reducer; and
a processor configured to control addition of peroxide from the peroxide source into the fluid stream so as to generate a dilute peroxide stream having a concentration of peroxide, control the pump to pressurize the dilute peroxide stream so as to increase a dissolved oxygen saturation limit of the dilute peroxide stream, and control passage of the pressurized dilute peroxide stream through the reactor so as to catalytically decompose the peroxide and generate oxygen and thereby form an oxygenated fluid,
wherein the pressure reducer is positioned downstream of the reactor and configured to reduce a pressure of the oxygenated fluid down to a reduced pressure, and
the processor is configured to control addition of the peroxide so as to add an amount of peroxide that, when catalytically decomposed, provides a dissolved oxygen concentration in the oxygenated fluid below the dissolved oxygen saturation limit of the oxygenated fluid at the reduced pressure.

22. The system of claim 21, wherein the processor is configured to control the pump so as to pressurize the dilute peroxide stream to a pressure ranging from 30 psi to 150 psi, and the pressure reducer is configured to reduce the pressure of the oxygenated fluid to below 5 psi.

23. The system of claim 21, wherein the peroxide is hydrogen peroxide, and the processor is configured to control addition of the peroxide so the concentration of the peroxide ranges from 0.005 weight percent to 0.0095 weight percent.

24. The system of claim 21, wherein the processor is configured to control passage of the pressurized dilute peroxide stream through the reactor so as to catalytically decompose the peroxide at a pressure approximately equal to atmospheric pressure and a temperature less than 100 degrees Celsius.

25. The system of claim 21, wherein the pressure reducer comprises one of a fluid friction device and a valve.

* * * * *